(12) United States Patent
Sander et al.

(10) Patent No.: US 12,265,908 B2
(45) Date of Patent: Apr. 1, 2025

(54) METHODS FOR INCREASING CACHE HIT RATES FOR NEURAL NETWORKS

(71) Applicants: Advanced Micro Devices, Inc., Santa Clara, CA (US); ATI Technologies ULC, Markham (CA)

(72) Inventors: Benjamin Thomas Sander, Austin, TX (US); Swapnil Sakharshete, San Diego, CA (US); Ashish Panday, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 979 days.

(21) Appl. No.: 17/008,360

(22) Filed: Aug. 31, 2020

(65) Prior Publication Data
US 2022/0067508 A1    Mar. 3, 2022

(51) Int. Cl.
*G06N 3/08* (2023.01)
*G06F 12/121* (2016.01)

(52) U.S. Cl.
CPC ............. *G06N 3/08* (2013.01); *G06F 12/121* (2013.01); *G06F 2212/1021* (2013.01)

(58) Field of Classification Search
CPC .......... G06N 3/08; G06N 3/045; G06N 3/084; G06F 12/121; G06F 12/0875; G06F 2212/1021; G06F 2212/453
See application file for complete search history.

(56) References Cited

U.S. PATENT DOCUMENTS

| | | |
|---|---|---|
| 5,657,420 A | 8/1997 | Jacobs et al. |
| 6,067,287 A | 5/2000 | Chung-Ju et al. |
| 8,131,660 B2 | 3/2012 | Davis et al. |
| 8,369,595 B1 | 2/2013 | Derakhshani et al. |
| 9,319,137 B2 | 4/2016 | Zhuge et al. |

(Continued)

FOREIGN PATENT DOCUMENTS

| | | |
|---|---|---|
| EP | 3098762 A1 | 11/2016 |
| WO | 2017003887 A1 | 1/2017 |

OTHER PUBLICATIONS

Non-Final Office Action in U.S. Appl. No. 15/657,613, mailed Oct. 5, 2018, 12 pages.
(Continued)

*Primary Examiner* — Dave Misir
(74) *Attorney, Agent, or Firm* — Kowert, Hood, Munyon, Rankin & Goetzel, P.C.; Rory D. Rankin (57) ABSTRACT

Systems, apparatuses, and methods for achieving higher cache hit rates for machine learning models are disclosed. When a processor executes a given layer of a machine learning model, the processor generates and stores activation data in a cache subsystem a forward or reverse manner. Typically, the entirety of the activation data does not fit in the cache subsystem. The processor records the order in which activation data is generated for the given layer. Next, when the processor initiates execution of a subsequent layer of the machine learning model, the processor processes the previous layer's activation data in a reverse order from how the activation data was generated. In this way, the processor alternates how the layers of the machine learning model process data by either starting from the front end or starting from the back end of the array.

20 Claims, 8 Drawing Sheets

(56) References Cited

U.S. PATENT DOCUMENTS

| | | |
|---|---|---|
| 10,078,794 B2 | 9/2018 | Pierce et al. |
| 10,762,392 B2 | 9/2020 | Zhang et al. |
| 11,227,214 B2 | 1/2022 | Lagudu et al. |
| 2015/0178246 A1 | 6/2015 | Herrero Abellanas et al. |
| 2015/0358755 A1 | 12/2015 | Luo et al. |
| 2016/0062294 A1 | 3/2016 | Murashima |
| 2016/0179434 A1 | 6/2016 | Herrero Abellanas et al. |
| 2017/0316312 A1 | 11/2017 | Goyal et al. |
| 2018/0032859 A1 | 2/2018 | Park et al. |
| 2018/0189641 A1 | 7/2018 | Boesch et al. |
| 2018/0218303 A1 | 8/2018 | Cole et al. |
| 2019/0028752 A1 | 1/2019 | Zhang et al. |
| 2019/0325305 A1 | 10/2019 | Zhang et al. |
| 2020/0081841 A1* | 3/2020 | Samynathan ....... G06F 12/0859 |
| 2020/0134432 A1 | 4/2020 | Lagudu et al. |
| 2020/0160182 A1* | 5/2020 | Matveev ................ G06N 3/045 |
| 2020/0302285 A1 | 9/2020 | Wang et al. |
| 2021/0201124 A1* | 7/2021 | Gelashvili .............. G06N 3/045 |
| 2021/0357760 A1* | 11/2021 | Tanaka ..................... G06N 3/10 |

OTHER PUBLICATIONS

Final Office Action in U.S. Appl. No. 15/657,613, mailed Mar. 8, 2019, 10 pages.

International Search Report and Written Opinion in International Application No. PCT/US2018/052358, mailed Feb. 18, 2019, 13 pages.

Cecconi et al., "Optimal Tiling Strategy for Memory Bandwidth Reduction for CNNs", International Conference on Advanced Concepts for Intelligent Vision Systems, Sep. 18, 2017, pp. 89-100.

Fan et al., "F-C3D: FPGA-based 3-Dimensional Convolutional Neural Network", 27th International Conference on Field Programmable Logic and Applications (FPL), Sep. 4, 2017, 4 pages.

Rahman et al., "Efficient FPGA Acceleration of Convolutional Neural Networks Using Logical-3D Compute Array", Proceedings of the 2016 Conference on Design, Automation & Test in Europe, Mar. 14, 2016, pp. 1393-1398.

Notice of Allowance in U.S. Appl. No. 16/234,956, mailed May 5, 2020, 10 pages.

* cited by examiner

METHODS FOR INCREASING CACHE HIT RATES FOR NEURAL NETWORKS

BACKGROUND

Description of the Related Art

An emerging technology field is machine learning, with a neural network being one type of a machine learning model. Neural networks have demonstrated excellent performance at tasks such as hand-written digit classification and face detection. Additionally, neural networks have also shown promise for performing well in other, more challenging visual classification tasks. Other applications for neural networks include speech recognition, language modeling, sentiment analysis, text prediction, and others.

Typically, each layer of a neural network processes activation data generated by the previous layer. The activation data of a given layer is usually larger than (i.e., includes an amount of data that exceeds) a size of the cache available for storing the activation data. This results in some amount of cache misses when processing moves from one level of the neural network to the next.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for achieving higher cache hit rates when implementing machine learning models are disclosed herein. In one implementation, a processor includes a cache subsystem with any number of cache levels. When the processor executes a given layer of a machine learning model, the processor generates activation data in a forward or reverse manner. The processor stores the activation data in the cache subsystem. In some cases, a size of the activation data is larger than a cache level of a cache subsystem. Consequently, as the data is written into the cache, a first portion of the data written into the cache will ultimately be overwritten as later data is written into the cache. If the next (e.g., second) layer then processes the data in the same order it was generated, accesses to the first portion of the data will miss in the cache and the data will have to be fetched into the cache. Fetching this data into the cache will in turn overwrite other data that was written into the cache. The end result is increased latencies in processing the data.

In order to address these problems, embodiments are described herein in which the second layer processes the data in an order that is the reverse of that generated by the previous (e.g., first) layer. As this latter data generated by the first layer will be in the cache, there is no latency due to a miss when the second layer seeks to access this particular data. However, at some point, the second layer will seek to access the first portion of the data generated by the first data. As noted above, this data was overwritten in the cache and will miss when the second layer seeks to access it. In order to address this, embodiments described herein begin prefetching this data as the second layer processes data in the cache. As the data consumed by the second layer will not generally be reused, it can be overwritten by the prefetched data. In this manner, when the second layer seeks to access the first data, it will be in the cache and an access latency will be avoided. Additionally, by having the second layer process the data in reverse order, prefetch of the data is hidden (i.e., a latency is not seen) and overall performance is improved.

In various embodiments, a processor records the order in which activation data is generated for a given layer of a machine learning model. When the processor initiates execution of a subsequent layer of the machine learning model, the processor processes the previous layer's activation data in a reverse order from how the activation data was generated by the previous layer. In this way, the processor alternates how the layers of the machine learning model process data by either starting from the lower elements of the activation data or starting from the upper elements of the activation data. This helps to increase the cache hit rate for a given layer when the size of the activation data is greater than the size of the cache.

Figure 1:
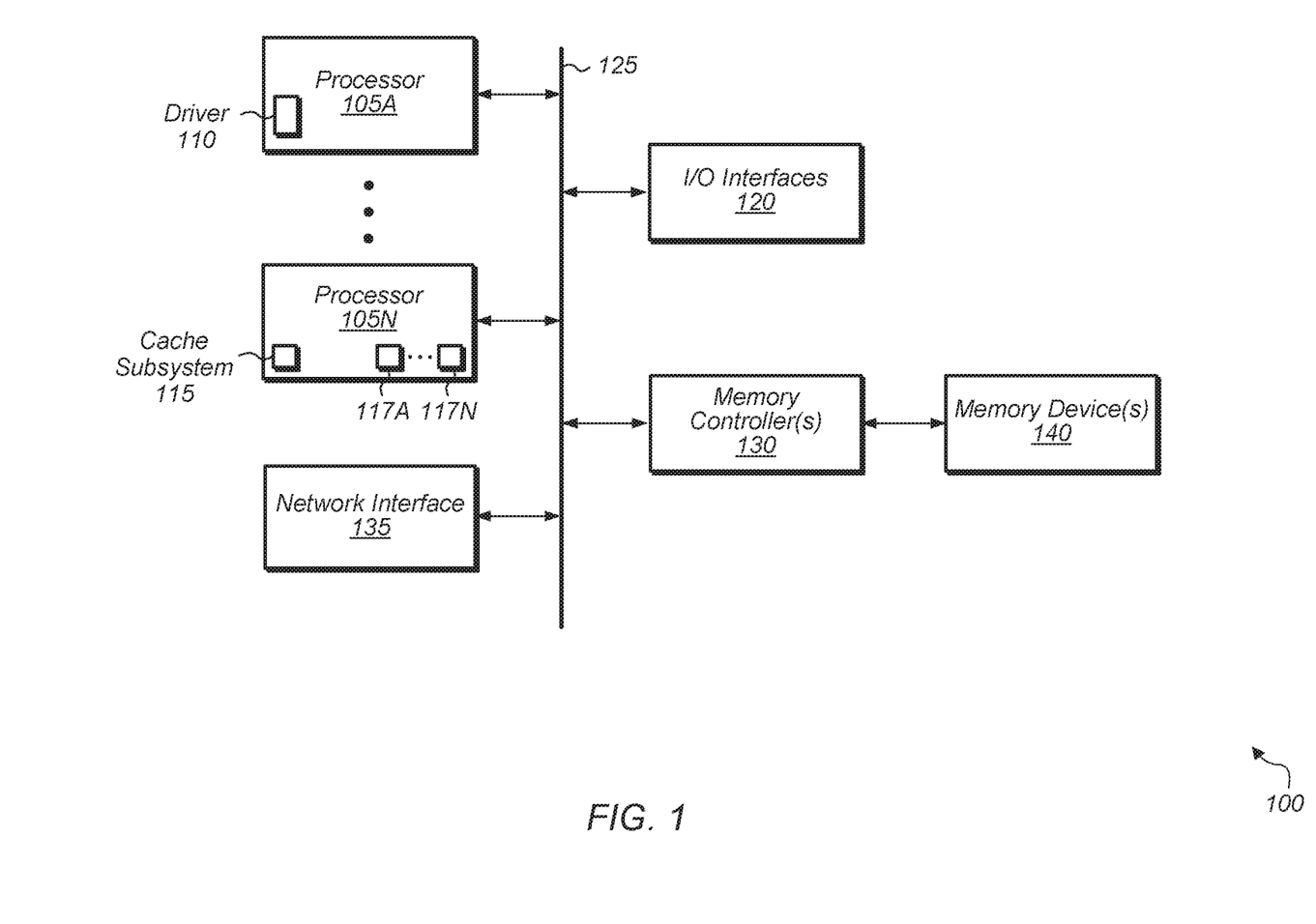
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, and memory device(s) 140. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105A executes a driver 110 (e.g., graphics driver) for controlling the operation of one or more of the other processors in system 100. It is noted that depending on the implementation, driver 110 can be implemented using any suitable combination of hardware, software, and/or firmware. In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors.

As shown, processor 105N includes any number of execution units 117A-N for executing instructions and at least one cache subsystem 115 for storing recently accessed data and/or instructions. Cache subsystem 115 includes any number of cache levels, with the number varying from implementation to implementation. In one implementation, when executing a given layer of a machine learning model, processor 105N consumes activation data in the reverse order compared to how the previous layer produced the activation data. This results in a better utilization of cache subsystem 115 and a higher cache hit rate than prior approaches. For example, if the previous layer generated activation data in an ascending order, the upper elements of the activation data will still be stored in cache subsystem 115 when the given layer is initiated. If the given layer starts processing activation data from the upper elements and moves in a descending direction through the activation data, the given layer's requests for the upper elements will hit in cache subsystem 115. However, if the given layer were to process the activation data in an ascending order, the given layer's initial requests for the lower elements would miss in cache subsystem 115 and cause the upper elements to be evicted. By the time the given layer reached the upper elements, these elements would have to be retrieved from memory device(s) 140.

Memory controller(s) 130 are representative of any number and type of memory controllers accessible by processors 105A-N. While memory controller(s) 130 are shown as being separate from processor 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140. For example, the type of memory in memory device(s) 140 includes high-bandwidth memory (HBM), non-volatile memory (NVM), Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network (not shown).

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
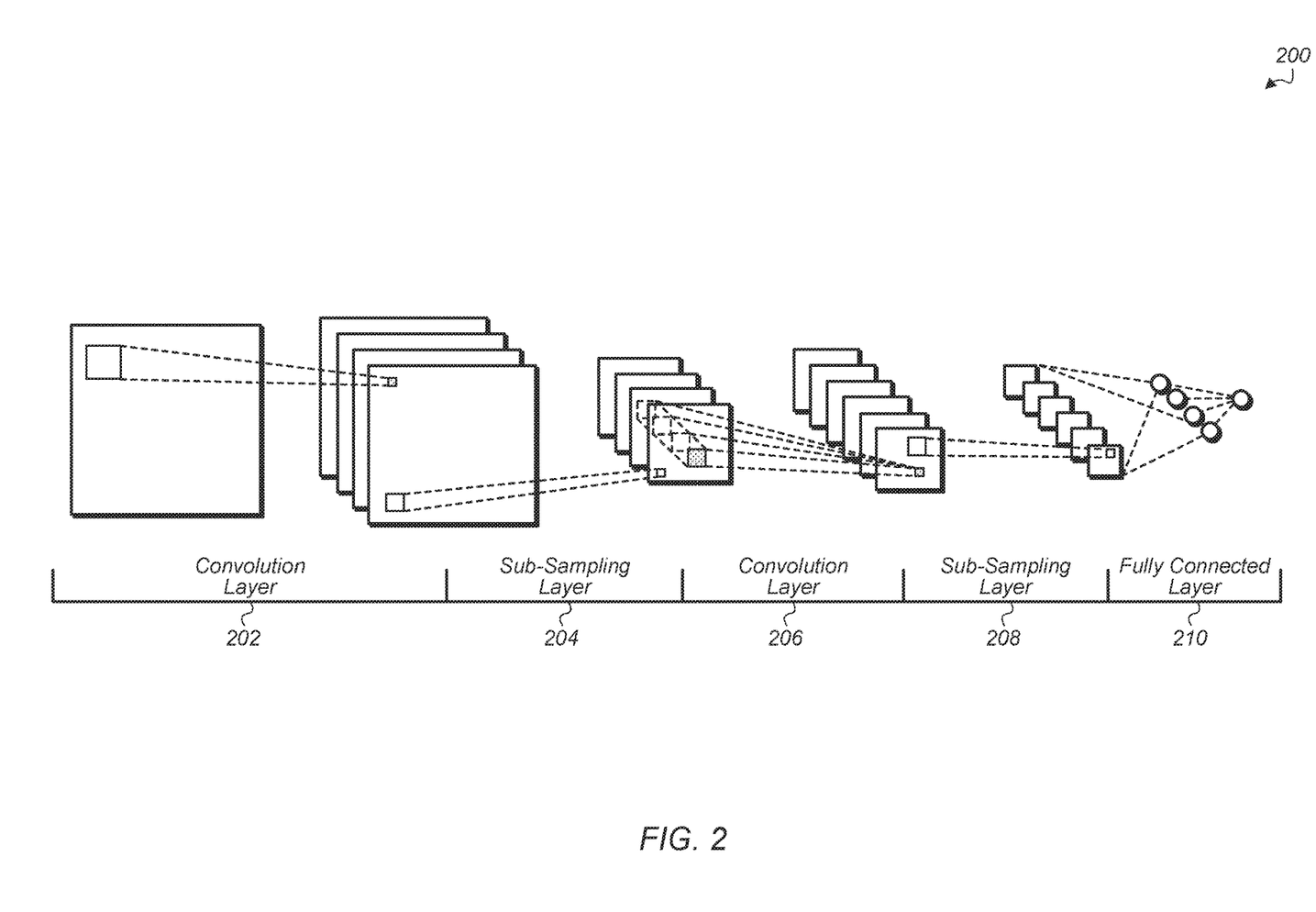
FIG. 2 is a block diagram of one implementation of a neural network.

Turning now to FIG. 2, a block diagram of one implementation of a neural network 200 is shown. Neural network 200 includes convolution layer 202, sub-sampling layer 204, convolution layer 206, sub-sampling layer 208, and fully connected layer 210. In other implementations, neural network 200 can include other numbers and arrangements of layers. When implementing neural network 200 on a computing system (e.g., system 100 of FIG. 1), the performance of neural network 200 can be improved by alternating the order in which each layer processes the previous layer's activation data. This can result in an increase in the cache hit rate for the system when implementing neural network 200.

Figure 3:
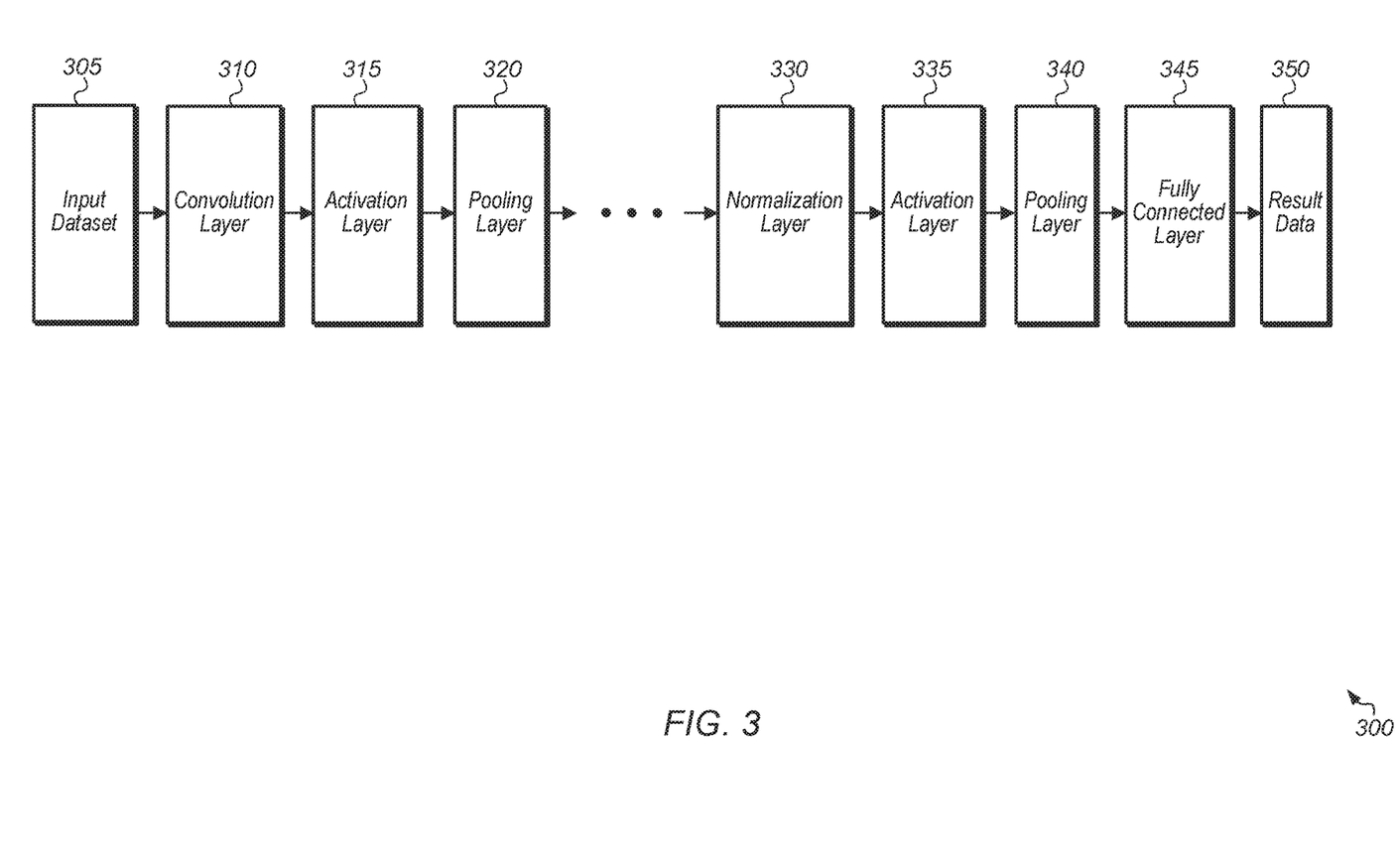
FIG. 3 is a block diagram of another implementation of a neural network.

Referring now to FIG. 3, a block diagram of another implementation of a neural network 300 is shown. Neural network 300 illustrates another example of a neural network that can be implemented on a computing system (e.g., system 100 of FIG. 1). Neural network 300 includes at least convolution layer 310, activation layer 315, pooling layer 320, normalization layer 330, activation layer 335, pooling layer 340, fully connected layer 345, and any number of other layers. In other implementations, neural network 300 includes other arrangements of layers different from what is shown in FIG. 3. In one implementation, each layer of neural network 300 is implemented by retrieving activation data from a cache in a reverse order from the order by which the previous layer stored the activation data.

Neural network 300 processes input dataset 305 to generate result data 350. In one implementation, input dataset 305 is an image. In this implementation, result data 350 can be a classification of the image, such as determining to which type of category the image belongs. In other implementations, input dataset 305 includes any of various other types of data. In these implementations, result data 350 can be a recommendation, natural language selection, or include other types of outputs and/or classifications.

Figure 4:
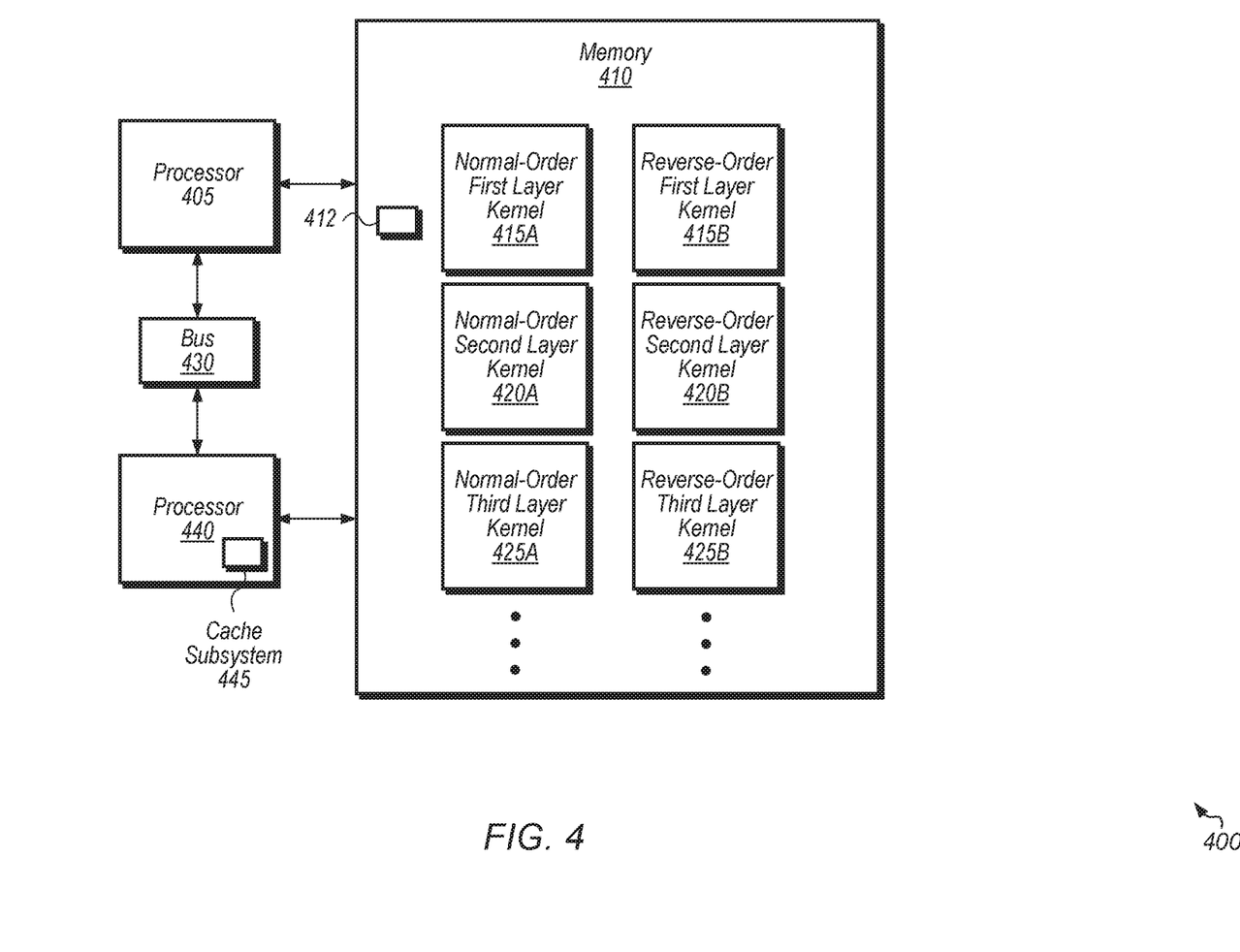
FIG. 4 is a block diagram of one implementation of a computing system.

Turning now to FIG. 4, a block diagram of one implementation of a computing system 400 is shown. In one implementation, computing system 400 includes at least processors 405 and 440, memory 410, and bus 430. Computing system 400 can also include other components which are not shown to avoid obscuring the figure. In one implementation, processor 405 is a CPU and processor 440 is a GPU. In other implementations, processor 405 and/or processor 440 can be other types of processing units.

In one implementation, processor 405 launches kernels to be executed on processor 440 to execute a machine learning model. Kernels 415A-B, 420A-B, and 425A-B are representative of any number of kernels which can be executed by processor 440 as part of a machine learning model. As used herein, the term "kernel" is defined as a function declared in a program. When operating upon multiple data elements, multiple instances of a kernel are executed in parallel on multiple processing elements. Each such instance is referred to as a "thread" or "work-item" of execution. As used herein, the term "work-item" is defined as one of a collection of parallel executions of a kernel invoked on a processing unit by a command. A group of such threads or work-items is also referred to as a "warp" or "wavefront". Typically, a GPU kernel has multiple warps or wavefronts. In one implementation, each layer of the machine learning model has a separate pair of kernels stored in memory 410. For example, to implement the first layer of the machine learning model, either normal-order first layer kernel 415A or reverse-order first layer kernel 415B is executed.

In one implementation, processor 405 queries activation data order indicator 412 to determine which kernel to launch on processor 440 for a given layer. For example, if normal-order first layer kernel 415A is launched on processor 440 to execute the first layer of the machine learning model, then indicator 412 is set to a first value. During execution of normal-order first layer kernel 415A, activation data is generated and stored in cache subsystem 445 in order from lower elements to upper elements. As used herein, "elements" of a data array are defined as data points, individual pixel values, convolutional filter results, rectified linear-unit results, or otherwise. When processor 405 is ready to launch a kernel for the second layer of the machine learning model, processor 415 queries indicator 412. In this example, since indicator 412 is set to the first value, processor 415 selects reverse-order second layer kernel 420B to be launched on processor 440. Then, processor 415 reverses the polarity of indicator 412 to cause indicator 412 to have a second value different from the first value.

Reverse-order second layer kernel 420B processes the activation data in a reverse order. Processing in reverse order means that the activation data is processed starting with upper elements and ending with lower elements. This allows processor 440 to achieve a relatively high cache hit rate when accessing cache subsystem 445 since the upper elements of the activation data are more likely to be resident in cache subsystem 445 since normal-order first layer kernel 415A was executed for the first layer of the machine learning model. Also, after each upper element of the activation data is retrieved from cache subsystem 445, a prefetch is generated for a lower element which was previously evicted from cache subsystem 445. In this way, while processor 440 is retrieving and processing upper elements of the activation data, lower elements are prefetched. Consequently, the lower elements of the activation data will be available in cache subsystem 445 by the time processor 440 is ready to process these elements.

Continuing with the above example, when processor 405 is ready to launch a kernel to execute the third layer of the machine learning model, processor 405 will query indicator 412 and retrieve the second value. This will cause processor 405 to select normal-order third layer kernel 425A to be launched on processor 440 to execute the third layer.

Alternatively, if reverse-order first layer kernel 415B was executed for the first layer of the machine learning model, processor 405 would launch normal-order second layer kernel 420A onto processor 440 followed by reverse-order third layer kernel 425B for the second and third layers, respectively, of the machine learning model. When implementing with a backward propagation pass through the machine learning model, if normal-order third layer kernel 425A is executed on the backward pass, then processor 405 will select reverse-order second layer kernel 420B to follow normal-order third layer kernel 425A. Then, processor 405 will select normal-order first layer kernel 415A to follow reverse-order second layer kernel 420B.

Figure 5:
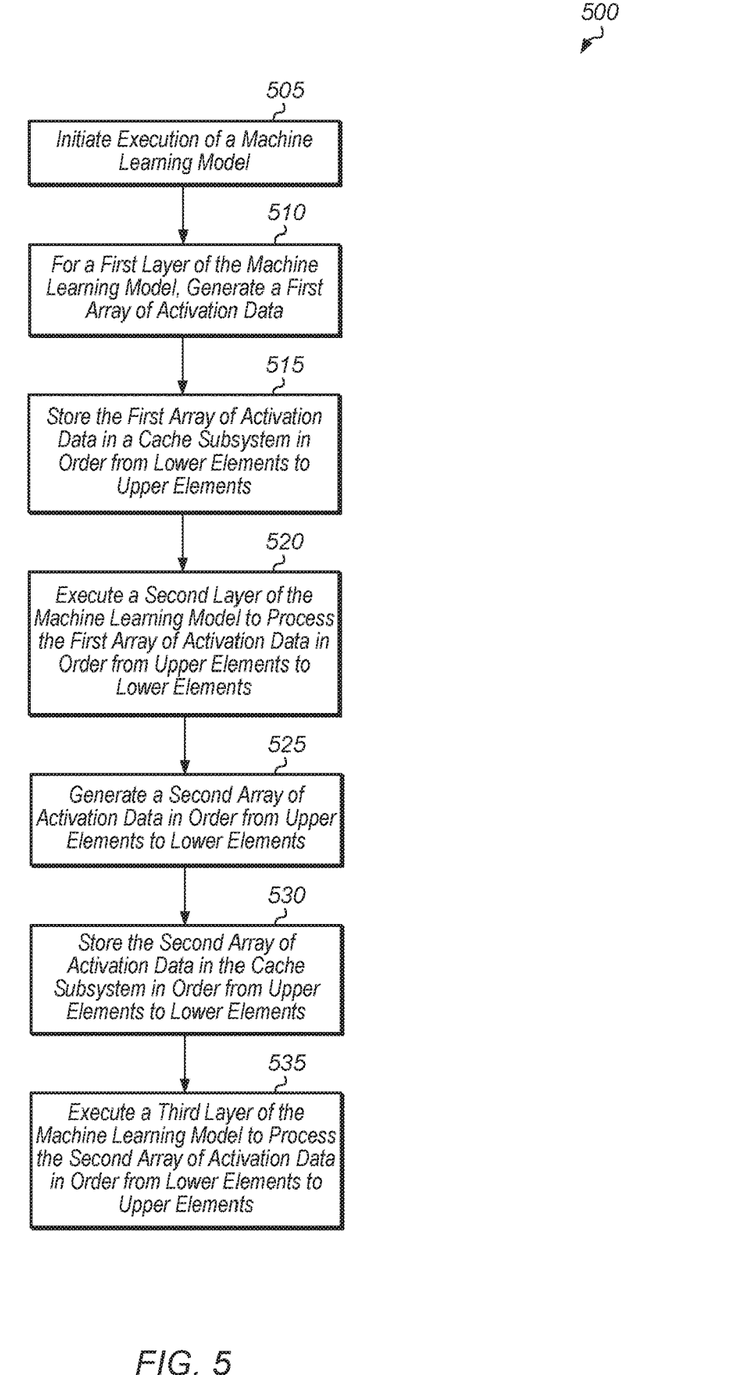
FIG. 5 is a generalized flow diagram illustrating one implementation of a method for increasing cache hit rates for machine learning models.
Figure 6:
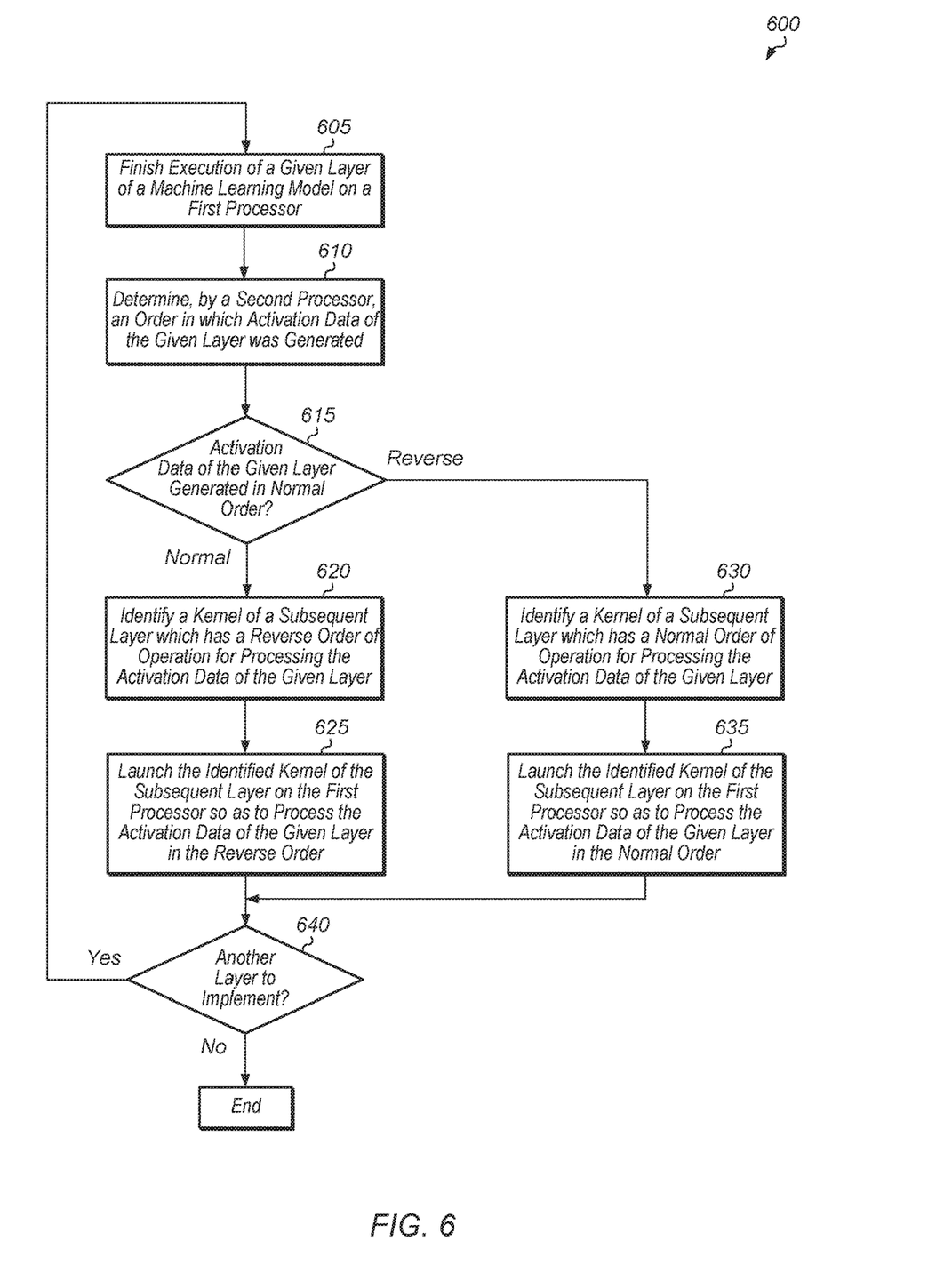
FIG. 6 is a generalized flow diagram illustrating one implementation of a method for launching the correct kernel for a machine learning model layer.
Figure 7:
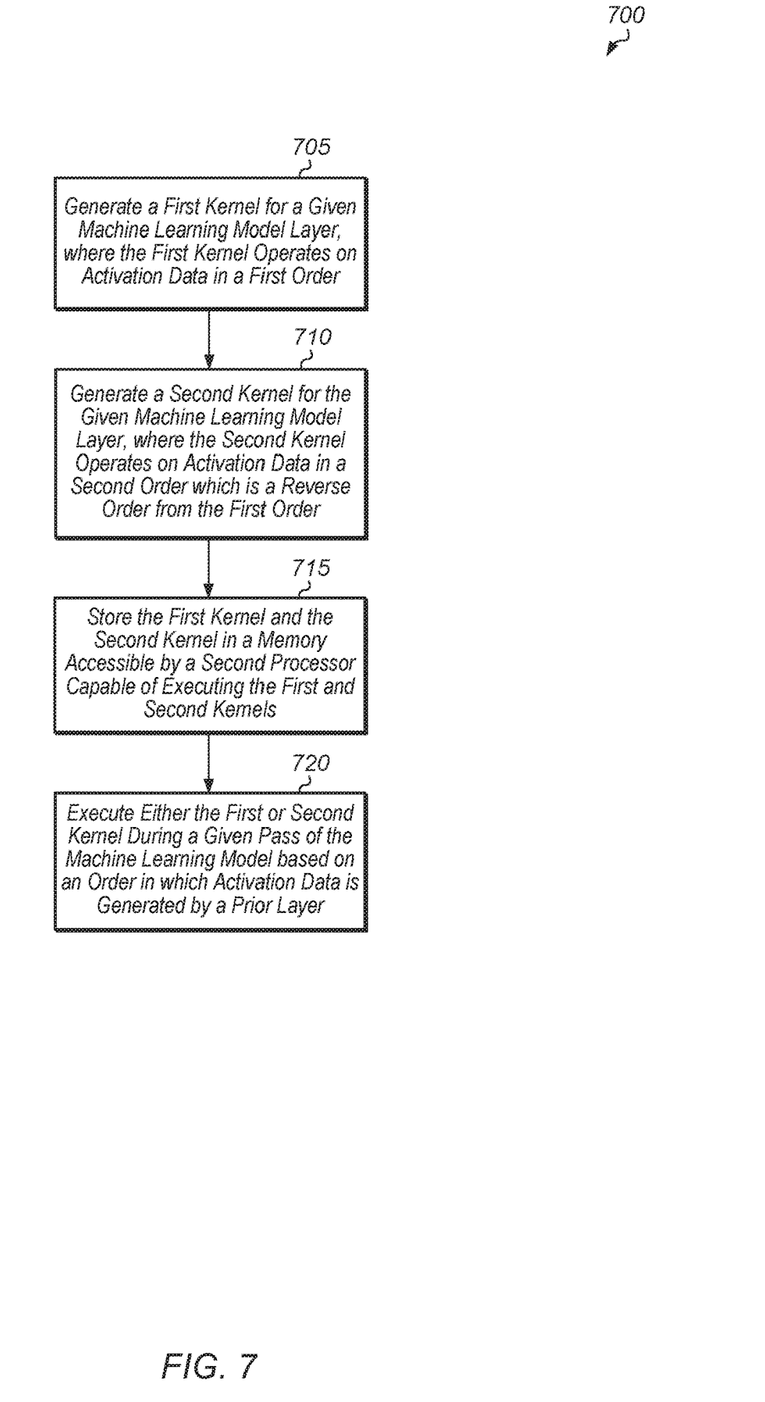
FIG. 7 is a generalized flow diagram illustrating one implementation of a method for generating multiple kernels for a given machine learning model layer.

Referring now to FIG. 5, one implementation of a method 500 for increasing cache hit rates for machine learning models is shown. For purposes of discussion, the steps in this implementation and those of FIG. 6-7 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

A processor initiates execution of a machine learning model (block 505). In one implementation, the machine learning model is a neural network. For a first layer of the machine learning model, the processor generates a first array of activation data (block 510). It is noted that each layer of the machine learning model is described as generating an array of activation data in method 500, this is indicative of only one particular implementation. In other implementations, the layers can generate, organize, and store activation data using other data structures and in other manners.

The processor stores the first array of activation data in a cache subsystem in order from lower elements to upper elements (block 515). Next, the processor executes (i.e., implements) a second layer of the machine learning model to process the first array of activation data in order from upper elements to lower elements (block 520). During processing of the first array of activation data, the processor generates a second array of activation data in order from upper elements to lower elements (block 525). Then, the processor stores the second array of activation data in the cache subsystem in order from upper elements to lower elements (block 530). Next, the processor executes a third layer of the machine learning model to process the second array of activation data in order from lower elements to upper elements (block 535). After block 535, method 500 ends. It is noted that method 500 can continue after block 535 for any number of subsequent layers, with the order of processing and storing of activation data alternating for back-to-back layers.

Turning now to FIG. 6, one implementation of a method 600 for launching the correct kernel for a machine learning model layer is shown. A first processor (e.g., processor 440 of FIG. 4) finishes execution of a given layer of a machine learning model (block 605). A second processor (e.g., processor 405 of FIG. 4) determines an order in which activation data of the given layer was generated (conditional block 610). If the activation data of the given layer was generated in normal order (i.e., ascending order) (conditional block 615, "normal" leg), then the second processor identifies a kernel of a subsequent layer which has a reverse order of operation for processing the activation data of the given layer (block 620). Next, the second processor launches the identified kernel of the subsequent layer on the first processor so as to process the activation data of the given layer in the reverse order (block 625).

Otherwise, if the activation data of the given layer was generated in reverse order (i.e., descending order) (conditional block 615, "reverse" leg), then the second processor identifies a kernel of a subsequent layer which has a normal order of operation for processing the activation data of the given layer (block 630). Next, the second processor launches the identified kernel of the subsequent layer on the first processor so as to process the activation data of the given layer in the normal order (block 635). After blocks 625 and 635, if there is another layer of the machine learning model to implement (conditional block 640, "yes" leg), then method 600 returns to block 605. Otherwise, if there are no more layers of the machine learning model to implement (conditional block 640, "no" leg), then method 600 ends. It is noted that method 600 can be performed with any type of machine learning model, as well as for forward or backward propagation passes through the machine learning model. The type of machine learning model can vary from implementation to implementation.

Referring now to FIG. 7, one implementation of a method 700 for generating multiple kernels for a given machine learning model layer is shown. A first processor generates a first kernel for a given machine learning model layer, where the first kernel operates on activation data in a first order (e.g., from lower elements of activation data to higher elements of activation data) (block 705). The first processor also generates a second kernel for the given machine learning model layer, where the second kernel operates on activation data in a second order (e.g., from higher elements of activation data to lower elements of activation data) which is a reverse order from the first order (block 710). The first processor stores the first kernel and the second kernel in a memory accessible by a second processor capable of executing the first and second kernels (block 715). The second processor executes either the first or second kernel during a given pass of the machine learning model based on an order in which activation data is generated by a prior layer (block 720). After block 720, method 700 ends.

Figure 8:
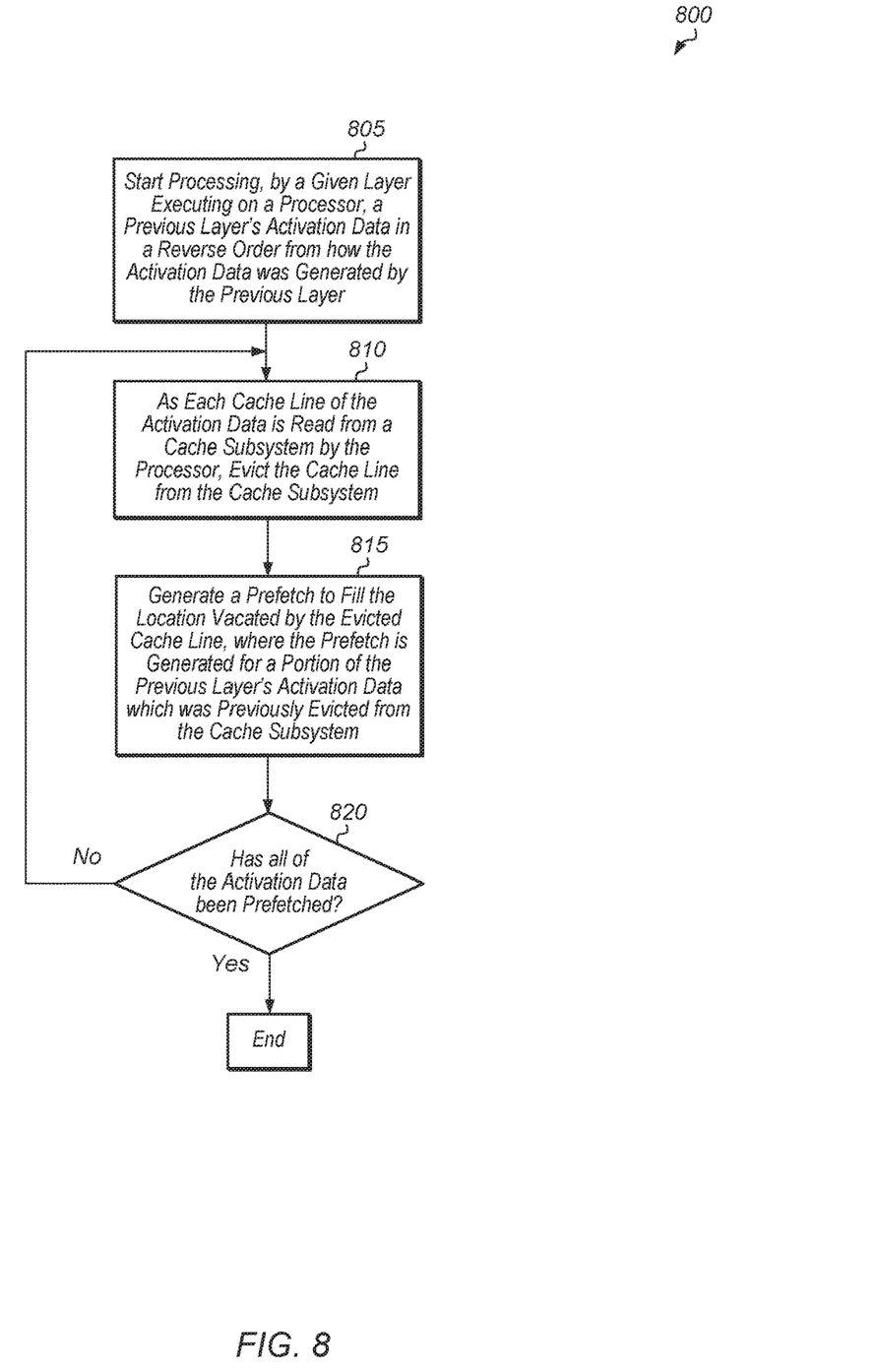
FIG. 8 is a generalized flow diagram illustrating one implementation of a method for reducing latency by prefetching activation data into a cache.

Turning now to FIG. 8, one implementation of a method 800 for reducing latency by prefetching activation data into a cache is shown. A given layer executing on a processor starts processing a previous layer's activation data in a reverse order from how the activation data was generated by the previous layer (block 805). As each cache line of the activation data is read from a cache subsystem by the processor, the cache line is evicted from the cache subsystem (block 810). Next, the processor generates a prefetch to fill the location vacated by the evicted cache line, where the prefetch is generated for a portion of the previous layer's activation data which was previously evicted from the cache subsystem (block 815).

In one implementation, the processor maintains a register with the next address of activation data to prefetch into the cache subsystem. The processor increments an address stored in the register after each prefetch. In other implementations, the processor uses other techniques for tracking which portion of activation data should be prefetched next. If not all of the activation data from the previous layer has been prefetched into the cache subsystem (conditional block 820, "no" leg), then method 800 returns to block 810. Otherwise, if all of the activation data from the previous layer has been prefetched into the cache subsystem (conditional block 820, "yes" leg), then method 800 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
   a cache subsystem; and
   one or more execution units comprising circuitry;
   wherein the processor comprises circuitry is configured to:
   generate activation data during execution, by the one or more execution units, of a first layer of a machine learning model;
   maintain, in a memory, a first kernel and a second kernel configured to process the activation data for a second layer of the machine learning model, wherein the first kernel is configured to operate on the activation data in a first order and the second kernel is configured to operate on the activation data in a reverse order of the first order;
   access the memory that stores the first kernel and the second kernel; and
   load the second kernel from the memory for processing the activation data of the second layer, responsive to an indication that the activation data was stored in the first order.

2. The processor as recited in claim 1, wherein the processor is configured to store the activation data in a given cache level of the cache subsystem, and wherein the activation data is larger than the given cache level.

3. The processor as recited in claim 1, wherein at least a first portion of the activation data stored in the cache subsystem is overwritten by a second portion of the activation data, prior to the one or more execution units executing the second layer.

4. The processor as recited in claim 1, wherein the processor is configured to evict the activation data from the cache subsystem as it is read by the one or more execution units for execution of the second layer of the machine learning model.

5. The processor as recited in claim 1, wherein the processor is further configured to
   store an indication of an order in which the activation data was stored.

6. The processor as recited in claim 5, wherein the processor is further configured to:
   generate second activation data during execution of the second layer; and
   store the second activation data in the cache subsystem in the reverse order; and
   store an indication that the second activation data was stored in the reverse order.

7. The processor as recited in claim 1, wherein the processor is further configured to:
   load, for processing the second layer, the first kernel responsive to an indication that the activation data was stored in the reverse order.

8. A method comprising:
   generating, by circuitry of a processor, activation data during execution of a first layer of a machine learning model;

maintaining, in a memory, a first kernel and a second kernel configured to process the activation data for a second layer of the machine learning model, wherein the first kernel is configured to operate on the activation data in a first order and the second kernel is configured to operate on the activation data in a reverse order of the first order;

accessing the memory that stores the first kernel and the second kernel; and loading the second kernel from the memory for processing the activation data of the second layer, responsive to an indication that the activation data was stored in the first order.

9. The method as recited in claim 8, further comprising storing the activation data in a given cache level of a cache subsystem, wherein the activation data is larger than the given cache level.

10. The method as recited in claim 8, wherein at least a first portion of the activation data stored in a cache subsystem is overwritten by a second portion of the activation data, prior to the circuitry of the processor executing the second layer.

11. The method as recited in claim 8, further comprising evicting the activation data from a cache subsystem as it is read by the circuitry of the processor for execution of the second layer.

12. The method as recited in claim 8, further comprising:
generating second activation data during execution of the second layer; and
storing the second activation data in a cache subsystem.

13. The method as recited in claim 8, further comprising prefetching a previously overwritten portion of the activation data, subsequent to evicting the activation data.

14. The method as recited in claim 8, further comprising loading a first kernel or a second kernel for a given layer of the machine learning model, based at least in part on an order in which a prior layer stored activation data.

15. A system comprising:
a cache subsystem;
a memory configured to store data evicted from the cache subsystem; and
a processor comprising circuitry configured to:
generate activation data during execution, by one or more execution units, of a first layer of a machine learning model;
maintain, in a memory, a first kernel and a second kernel configured to process the activation data for a second layer of the machine learning model, wherein the first kernel is configured to operate on the activation data in a first order and the second kernel is configured to operate on the activation data in a reverse order of the first order; and
access the memory that stores the first kernel and the second kernel; and
load the second kernel from the memory for processing the activation data of the second layer, responsive to an indication that the activation data was stored in the first order.

16. The system as recited in claim 15, wherein the processor is configured to store the activation data in a given cache level of the cache subsystem, and wherein the activation data is larger than the given cache level.

17. The system as recited in claim 16, wherein the processor is configured to retrieve the activation data from the given cache level during execution of the second layer.

18. The system as recited in claim 16, wherein responsive to processing and evicting a first cache line of activation data, the processor is configured to prefetch a second cache line of previously evicted activation data into a location in the given cache level vacated by the first cache line.

19. The system as recited in claim 15, wherein the processor is further configured to:
generate second activation data during execution of the second layer; and
store the second activation data in the cache subsystem in the reverse order.

20. The system as recited in claim 19, wherein the processor is further configured to execute a third layer of the machine learning model to process the second activation data in the first order.

* * * * *